US010844934B2

United States Patent
Yu et al.

(10) Patent No.: US 10,844,934 B2
(45) Date of Patent: Nov. 24, 2020

(54) VEHICLE DRIVING ASSEMBLY WITH TRANSVERSELY PLACED DOUBLE POWER SOURCES

(71) Applicant: Jing-Jin Electric Technologies Co., Ltd., Beijing (CN)

(72) Inventors: Ping Yu, Beijing (CN); Changqi Yang, Beijing (CN); Jianwen Li, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 259 days.

(21) Appl. No.: 15/748,135

(22) PCT Filed: Jan. 20, 2017

(86) PCT No.: PCT/CN2017/071843
§ 371 (c)(1),
(2) Date: Jan. 26, 2018

(87) PCT Pub. No.: WO2018/090484
PCT Pub. Date: May 24, 2018

(65) Prior Publication Data
US 2019/0017572 A1 Jan. 17, 2019

(30) Foreign Application Priority Data
Nov. 18, 2016 (CN) .......................... 2016 1 1028709

(51) Int. Cl.
*F16H 3/089* (2006.01)
*F16H 57/023* (2012.01)
(Continued)

(52) U.S. Cl.
CPC ............ *F16H 3/089* (2013.01); *B60K 6/387* (2013.01); *B60K 6/442* (2013.01); *B60K 6/543* (2013.01);
(Continued)

(58) Field of Classification Search
CPC .......... F16H 3/006; F16H 3/089; F16H 3/093; F16H 3/0933; F16H 3/72; F16H 61/688;
(Continued)

(56) References Cited

U.S. PATENT DOCUMENTS 7,185,722 B1   3/2007 Sakamoto
8,408,342 B2 *   4/2013 Wang .................... B60K 17/00
                                         180/65.265
(Continued)

FOREIGN PATENT DOCUMENTS

CN       201753013 U    3/2011
CN       102700407 A   10/2012
(Continued)

OTHER PUBLICATIONS

Han Xiao, et al. Machine Translation of Chinese Document CN104565226. Espacenet. Translated Dec. 9, 2019. (Year: 2015).*
(Continued)

*Primary Examiner* — Charles A Fox
*Assistant Examiner* — Lori Wu
(74) *Attorney, Agent, or Firm* — Fox Rothschild LLP; Carol E. Thorstad-Forsyth

(57) ABSTRACT

The present disclosure discloses a vehicle driving assembly with transversely placed double power sources comprising two power sources and an automatic transmission, and the two power sources are individually connected to two input shafts of the automatic transmission. A first intermediate shaft is provided parallel to the first input shaft. A second intermediate shaft and a third intermediate shaft are indi-
(Continued)

vidually provided in the directions coaxial with the first input shaft and the first intermediate shaft. A first clutch is provided between the first intermediate shaft and the third intermediate shaft. A second clutch is provided between the first input shaft and the second intermediate shaft. A first gear on the first input shaft and a second gear on the first intermediate shaft are engaged to transmit power. A third gear on the second intermediate shaft and a fourth gear on the third intermediate shaft are engaged to transmit power. A fifth gear on the third intermediate shaft and a sixth gear on the differential are engaged to transmit power. The second input shaft is provided with a seventh gear that is in engagement with the third gear. The present disclosure can realize transmissions of three speed ratios, make transmission modes flexible, shorten the longitudinal dimension of the driving assembly, and is suitable for vehicles with a compact structure.

8 Claims, 2 Drawing Sheets

(51) Int. Cl.
| | | |
|---|---|---|
| B60K 6/387 | (2007.10) | |
| F16H 61/688 | (2006.01) | |
| F16H 3/00 | (2006.01) | |
| B60K 6/442 | (2007.10) | |
| B60K 6/543 | (2007.10) | |
| B60K 6/547 | (2007.10) | |
| F16H 3/093 | (2006.01) | |

(52) U.S. Cl.
CPC ............ *B60K 6/547* (2013.01); *F16H 3/006* (2013.01); *F16H 57/023* (2013.01); *F16H 61/688* (2013.01); F16H 2003/0933 (2013.01); F16H 2200/0021 (2013.01); F16H 2200/0034 (2013.01); F16H 2200/2035 (2013.01)

(58) Field of Classification Search
CPC ..... F16H 2200/0021; F16H 2200/0034; F16H 2200/0035; B60K 6/387; B60K 6/40; B60K 6/442; B60K 6/48; B60K 6/543; B60K 6/547
See application file for complete search history.

(56) References Cited

U.S. PATENT DOCUMENTS

| | | | |
|---|---|---|---|
| 2009/0036269 A1 | 2/2009 | Kim | |
| 2009/0283344 A1* | 11/2009 | Arnold | B60K 6/26 180/65.22 |
| 2013/0036863 A1* | 2/2013 | Blessing | B60K 6/40 74/661 |
| 2014/0332301 A1 | 11/2014 | Knoblauch et al. | |
| 2015/0176682 A1* | 6/2015 | Ruehle | B60K 6/48 74/661 |
| 2015/0211607 A1 | 7/2015 | Nakashima et al. | |
| 2015/0211616 A1 | 7/2015 | Yang et al. | |
| 2016/0325614 A1 | 11/2016 | Yang et al. | |
| 2018/0001760 A1* | 1/2018 | Eo | F16H 3/089 |

FOREIGN PATENT DOCUMENTS

| | | |
|---|---|---|
| CN | 104565226 A | 4/2015 |
| CN | 104595450 A | 5/2015 |
| CN | 104819255 A | 8/2015 |
| CN | 105459793 A | 4/2016 |
| CN | 105972163 A | 9/2016 |
| CN | 206280446 U | 6/2017 |
| DE | 102012222681 A1 | 6/2014 |
| EP | 3020588 A2 | 5/2016 |
| JP | 2004208473 A | 7/2004 |
| JP | 2006315673 A | 11/2006 |
| JP | 2009035241 A | 2/2009 |
| JP | 2015505762 A | 2/2015 |
| JP | 2015140127 A | 8/2015 |

OTHER PUBLICATIONS

First Office Office received for CN 201611028709.08 dated May 31, 2018.
Extended European Search Report dated Feb. 11, 2020 in European Patent Application No. 17871704.
Office Action entered in Japanese Patent Application No. 2019-526523 drafted on May 19, 2020.

* cited by examiner

VEHICLE DRIVING ASSEMBLY WITH TRANSVERSELY PLACED DOUBLE POWER SOURCES

TECHNICAL FIELD

The present disclosure relates to a vehicle driving assembly with transversely placed double power sources, connected to the vehicle front axle or rear axle, for driving the vehicle.

BACKGROUND ART

In current purely electrical driven or hybrid new energy automobiles, the dynamic characteristics of the electric motors being used cannot meet the requirements of the entire vehicle, especially the requirements of speed ratio and moment. As new energy automobiles need to face increasingly complicated operating conditions and road conditions, the users' expectations on comfortable and endurance mileage of new energy automobiles keep increasing, and new energy automobiles of simple electric motor direct driving mode, electric-motor-connected-to-speed-reducer mode or fuel and electricity hybrid power mode cannot satisfy demands of the developing new energy automobile industry.

In current vehicle powertrains, power source, clutch, gearbox or reducer, and driving shaft are generally longitudinally arranged, so these vehicle powertrains are relatively long and large, and not applicable to some small vehicles requiring a compact structure.

Furthermore, in current purely electrical driven or hybrid new energy automobiles, reducers cannot use conventional friction clutches due to the large shock of the rotor shaft of electric motor (the rotor shaft and the input shaft are not integrated). The clutch being used can only be hard connected and does not have damping effect, so it cannot satisfy the requirements of new energy automobiles.

In the existing automobiles of electric motor direct driving mode, the power system does not have clutch function, so the conventional inertia friction synchronizers cannot be used, the transmission cannot shift gears, and only one speed ratio can be chosen. The startup and stop of the vehicle can only rely on the startup and stop of the electric motor, which affects the performance of the electric motor.

SUMMARY OF THE DISCLOSURE

In view of the above problems in the prior art, the present disclosure provides a vehicle driving assembly with transversely placed double power sources, to solve the problem of the existing powertrains that the transmission is performed in a single speed ratio, and they cannot adapt to complicated road conditions and operating conditions.

Additionally, the present disclosure is to solve the problems of the existing powertrains that the longitudinal dimension is large, so they cannot be used in vehicles with a compact structure, and that the number of gears in the transmission is large and thus the transmission structure is complicated.

To achieve the above objects, the technical solutions of the present disclosure are realized as follows:

A vehicle driving assembly with transversely placed double power sources, connected to a vehicle axle half shaft, the vehicle driving assembly comprises a first power source, a second power source and an automatic transmission, the automatic transmission is provided with a first input shaft and a second input shaft, the power sources are individually connected to the two input shafts, and a differential is provided at a joint of the automatic transmission and the vehicle axle half shaft;

in the automatic transmission, a first intermediate shaft is provided parallel to the first input shaft, a second intermediate shaft is provided in the direction coaxial with the first input shaft, a third intermediate shaft is provided in the direction coaxial with the first intermediate shaft, a first clutch is provided between the first intermediate shaft and the third intermediate shaft, and a second clutch is provided between the first input shaft and the second intermediate shaft;

the first input shaft is provided with a first gear, the first intermediate shaft is provided with a second gear, and the first gear and the second gear are engaged to transmit power; the second intermediate shaft is provided with a third gear, the third intermediate shaft is provided with a fourth gear, and the third gear and the fourth gear are engaged to transmit power; and the third intermediate shaft is further provided with a fifth gear, the differential is provided with a sixth gear, and the fifth gear and the sixth gear are engaged to transmit power; and the second input shaft is provided with a seventh gear, and the seventh gear and the third gear are engaged to transmit power.

Optionally, the second power source is an electric motor, and the second power source transmits power to the vehicle axle half shaft via successively the second input shaft, the seventh gear, the third gear, the fourth gear, the third intermediate shaft, the fifth gear, the sixth gear and the differential.

Optionally, when the first clutch is in engagement, the first power source transmits power to the vehicle axle half shaft via successively the first input shaft, the first gear, the second gear, the first intermediate shaft, the third intermediate shaft, the fifth gear, the sixth gear and the differential.

Optionally, the engaged transmission ratio of the first gear to the second gear is i1, the engaged transmission ratio of the fifth gear to the sixth gear is i3, and when the first clutch is in engagement, the engaged transmission ratio in the automatic transmission is i1×i3.

Optionally, when the second clutch is in engagement, the first power source transmits power to the vehicle axle half shaft via successively the first input shaft, the second intermediate shaft, the third gear, the fourth gear, the third intermediate shaft, the fifth gear, the sixth gear and the differential.

Optionally, the engaged transmission ratio of the third gear to the fourth gear is i2, the engaged transmission ratio of the fifth gear to the sixth gear is i3, and when the second clutch is in engagement, the engaged transmission ratio in the automatic transmission is i2×i3.

Optionally, the engaged transmission ratio of the seventh gear, the third gear and the fourth gear is i4, the engaged transmission ratio of the fifth gear to the sixth gear is i3, and when both the first clutch and the second clutch are released, the engaged transmission ratio in the automatic transmission is i4×i3.

Optionally, the first power source is an electric motor or the combination of an engine and an ISG electric motor.

Optionally, the power source is the combination of an engine and an ISG electric motor, and a torsional shock absorber is provided between the engine and the ISG electric motor.

Optionally, the vehicle axle half shaft is a front axle half shaft or a rear axle half shaft, and the first clutch and the second clutch are face tooth clutches.

Optionally, the face tooth clutches are of electromagnetic driving type, hydraulic driving type, pneumatic driving type, or electrical driving type.

The present disclosure employing the above structure configurations has the following advantages:

The vehicle powertrain of the present disclosure is connected to the rear axle half shaft or the front axle half shaft of the vehicle. The vehicle powertrain can realize double power source input and transmission of three speed ratios. The transmission modes are flexible, and can satisfy the demands of the entire vehicle for running under different road conditions. When the vehicle climbs a slope with a heavy load, double power input and large speed ratio can be chosen to increase the driving force of the entire vehicle and overcome the defect of insufficient driving force of the entire vehicle. When the entire vehicle is cruising, single power input and small speed ratio can be chosen to satisfy the requirement of the entire vehicle for high speed running, energy saving, and increasing the endurance mileage of vehicle.

The design mode of the torsional shock absorber in combination with the face tooth clutches can minimize kinetic energy loss, and overcome the defect of traditional friction clutches that their service lives are too short because they cannot withstand the dynamic shock of the electric motor.

The vehicle driving assembly with transversely placed double power sources provided by the present disclosure shortens the longitudinal dimension of the driving assembly, and is suitable for vehicles of a compact structure; moreover, since the number of gears being used is small, the transmission structure is simplified.

Furthermore, when the first clutch or the second clutch is in engagement and both the first power source and the second power source are turned on, the overall driving force of the driving assembly can be increased, and when the vehicle starts up, the acceleration process of the vehicle can be shortened, and high speed running can be reached more quickly.

The above description is merely an overview of technical solutions of the present disclosure. In order to more apparently understand the technical solutions of the present disclosure and implement them in accordance with the contents of specification, and to more readily understand above and other objectives, features and advantages of the present disclosure, particular embodiments of the present disclosure are provided hereinafter.

BRIEF DESCRIPTION OF THE DRAWINGS

Various other advantages and merits will become apparent to those having ordinary skill in the art by reading through the detailed description of the following preferred embodiments. Accompanying drawings are merely included for the purpose of illustrating the preferred embodiments and should not be considered as limiting of the present disclosure. Further, throughout the drawings, like reference signs are used to denote like elements. In the drawings.

In the drawings.

10, automatic transmission; 11, first gear; 12, second gear; 13, third gear; 14, fourth gear; 15, fifth gear; 16, sixth gear; 17, seventh gear;

21, first input shaft; 22, second input shaft;

31, first intermediate shaft; 32, second intermediate shaft; 33, third intermediate shaft;

41, first clutch; 42, second clutch;

50, differential;

60, electric motor;

70, electric motor;

71, engine; 72, ISG electric motor; and 73, torsional shock absorber.

DETAILED DESCRIPTION

Exemplary embodiments of the present disclosure will be described in more detail below with reference to the accompanying drawings. Although the accompanying drawings display the exemplary embodiments of the present disclosure, it should be understood that the present disclosure may be implemented in various forms and not limited by the embodiments set forth herein. Instead, these embodiments are provided to facilitate those skilled in the art more thoroughly understand the present disclosure, and completely convey the scope of the present disclosure to them.

First Embodiment

Figure 1:
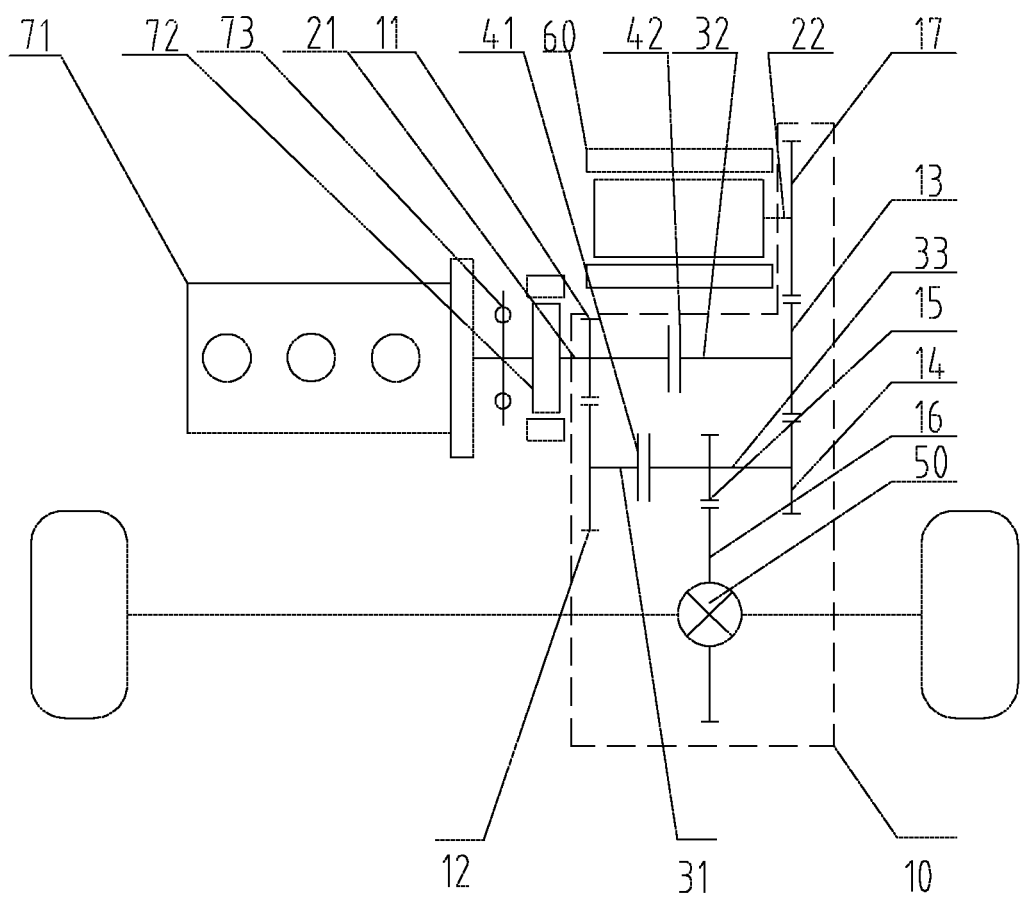
FIG. 1 is a schematic diagram of the structure of the first embodiment of the present disclosure.

As shown in FIG. 1, in the first embodiment of the present disclosure, there is provided a vehicle driving assembly with transversely placed double power sources, connected to a vehicle axle half shaft. The vehicle driving assembly comprises a first power source, a second power source and an automatic transmission 10. The automatic transmission 10 is provided with a first input shaft 21 and a second input shaft 22. The power sources are individually connected to the two input shafts. A differential 50 is provided at the joint of the automatic transmission 10 and the vehicle axle half shaft.

In the automatic transmission 10, a first intermediate shaft 31 is provided parallel to the first input shaft 21, a second intermediate shaft 32 is provided in the direction coaxial with the first input shaft 21, a third intermediate shaft 33 is provided in the direction coaxial with the first intermediate shaft 31, a first clutch 41 is provided between the first intermediate shaft 31 and the third intermediate shaft 33, and a second clutch 42 is provided between the first input shaft 21 and the second intermediate shaft 32.

The first input shaft 21 is provided with a first gear 11, the first intermediate shaft 31 is provided with a second gear 12, and the first gear 11 and the second gear 12 are engaged to transmit power; the second intermediate shaft 32 is provided with a third gear 13, the third intermediate shaft 33 is provided with a fourth gear 14, and the third gear 13 and the fourth gear 14 are engaged to transmit power; the third intermediate shaft 33 is further provided with a fifth gear 15, the differential 50 is provided with a sixth gear 16, and the fifth gear 15 and the sixth gear 16 are engaged to transmit power.

The second input shaft 22 is provided with a seventh gear 17, and the seventh gear 17 and the third gear 13 are engaged to transmit power.

It can be known from the above that, the transmission of the vehicle driving assembly of the first embodiment of the present disclosure is different from traditional transmissions in the layout mode of input shaft, intermediate shaft and output shaft. Thereby the longitudinal dimension of the driving assembly is shortened, which makes it suitable for vehicles with a compact structure; moreover, since the number of gears being used is small, the transmission process is simplified.

In the present embodiment, the second power source is an electric motor 60, and the second power source transmits power to the vehicle axle half shaft via successively the second input shaft 22, the seventh gear 17, the third gear 13, the fourth gear 14, the third intermediate shaft 33, the fifth gear 15, the sixth gear 16 and the differential 50. In addition, the rotor shaft of the electric motor 60 and the second input shaft 22 are integrated.

In the present embodiment, the first power source is the combination of an engine 71 and an ISG electric motor 72. Thereby the idle speed loss and the pollution of the engine can be reduced; moreover, the ISG (i.e. Integrated Starter Generator) electric motor serves as an electric generator and can regenerate power and recycle energy, and thus saves energy.

The power transmission mode of the driving assembly is as follows:

When the first clutch 41 is in engagement, the first power source transmits power to the vehicle axle half shaft via successively the first input shaft 21, the first gear 11, the second gear 12, the first intermediate shaft 31, the third intermediate shaft 33, the fifth gear 15, the sixth gear 16 and the differential 50. If the engaged transmission ratio of the first gear 11 to the second gear 12 is set to i1, and the engaged transmission ratio of the fifth gear 15 to the sixth gear 16 is set to i3, when the first clutch 41 is in engagement, the engaged transmission ratio in the automatic transmission 10 is i1×i3; this is the first operating condition.

When the second clutch 42 is in engagement, the first power source transmits power to the vehicle axle half shaft via successively the first input shaft 21, the second intermediate shaft 32, the third gear 13, the fourth gear 14, the third intermediate shaft 33, the fifth gear 15, the sixth gear 16 and the differential 50. If the engaged transmission ratio of the third gear 13 to the fourth gear 14 is set to i2, and the engaged transmission ratio of the fifth gear 15 to the sixth gear 16 is set to i3, when the second clutch 42 is in engagement, the engaged transmission ratio in the automatic transmission 10 is i2×i3; this is the second operating condition.

Since the second power source is an accessory power source and the speed of the electric motor can be adjusted freely, if in the first operating condition or the second operating condition the second power source also starts up, the above results of engaged transmission ratios in the automatic transmission 10 remain unchanged.

If the engaged transmission ratio of the seventh gear 17, the third gear 13 (deemed as an idle gear at this point) and the fourth gear 14 is set to i4, when both the first clutch 41 and the second clutch 42 are released, the engaged transmission ratio in the automatic transmission 10 is i4×i3; this is the third operating condition.

The magnitudes of transmission ratios i1, i2, i3 and i4 can be changed by changing size or tooth number of the gears, and thus the transmission ratio of the automatic transmission 10 is changed.

It can be known from the above that, the driving assembly of the embodiment of the present disclosure can realize three transmission ratios:

When the first power source is turned on, the first clutch 41 is in engagement and the second clutch 42 is released, the engaged transmission ratio in the automatic transmission 10 is i1×i3. At this point, the second power source can be turned on or off. When the second power source is turned on, the overall driving force of the driving assembly can be increased, and when the vehicle starts up, the acceleration process of the vehicle can be shortened, and high speed running can be reached more quickly.

When the first power source is turned on, the second clutch 42 is in engagement and the first clutch 41 is released, the engaged transmission ratio in the automatic transmission 10 is i2×i3. At this point, the second power source can be turned on or off. Likewise, when the second power source is turned on, the overall driving force of the driving assembly can be increased.

When the second power source is turned on, the first clutch 41 is released and the second clutch 42 is released, the engaged transmission ratio in the automatic transmission 10 is i4×i3. At this point, the first power source can be turned on or off. When the first power source is turned on, the power of the first power source cannot be transmitted to the vehicle axle half shaft, and only the ISG electric motor serves as an electric generator and regenerate electricity; the electric power is stored in a battery or used for the operating of the second power source.

It can be known from the above that, the vehicle driving assembly can realize double power source input and transmission of three speed ratios. The transmission modes are flexible, and can satisfy the demands of the entire vehicle for running under different road conditions. When the vehicle climbs a slope with a heavy load, double power input and large speed ratio transmission can be chosen to increase the driving force of the entire vehicle and overcome the defect of insufficient driving force of the entire vehicle. When the entire vehicle is cruising, single power input and small speed ratio transmission can be chosen to satisfy the requirement of the entire vehicle for high speed running, energy saving, and increase the endurance mileage of vehicle.

In the embodiment of the present disclosure, the vehicle axle half shaft is a front axle half shaft or a rear axle half shaft. When the vehicle driving assembly is connected to the front axle half shaft, the vehicle is in front driving mode; when the vehicle driving assembly is connected to the rear axle half shaft, the vehicle is in rear driving mode.

The first clutch 41 and the second clutch 42 are face tooth clutches comprising a movable fluted disc and a fixed fluted disc, which are engaged to transmit power. The movable fluted disc is provided with end face transmission gears or tooth spaces, and the fixed fluted disc is correspondingly provided with end face tooth spaces or transmission gears. The face tooth clutches, compared with friction clutches, can reduce kinetic energy loss to the largest extent, and overcome the defect of traditional friction clutches that life is too short because they cannot withstand the dynamic shock of the electric motor.

The drive manner of the face tooth clutches may be electromagnetic driving type (driven by electromagnet attraction), hydraulic driving type (driven by a hydraulic mechanism), pneumatic driving type (driven by a pneumatic mechanism), or electrical driving type (driven by an electric motor). The movable fluted disc is driven to axially move and engage with the fixed fluted disc.

When the first clutch 41 and the second clutch 42 of the vehicle driving assembly are electromagnetic jaw clutches, the electromagnetic jaw clutches can enable the power and the entire vehicle to be released and engaged instantly at any moment during power input, and thus realizes smooth power switching and increases travelling stability of the vehicle.

Second Embodiment

Figure 2:
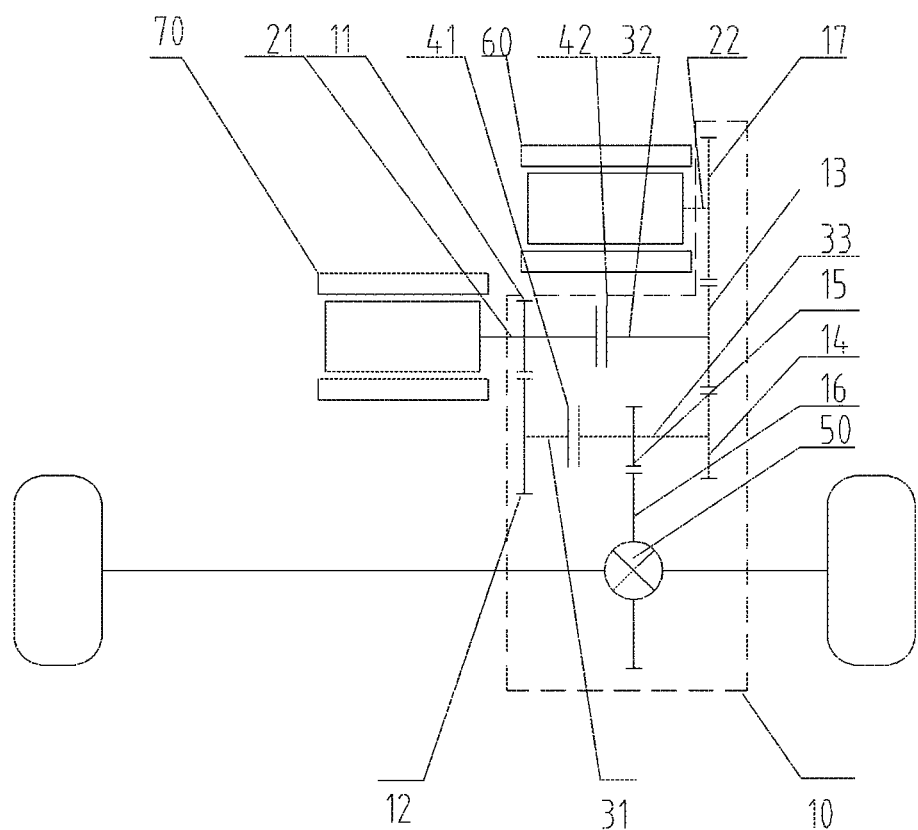
FIG. 2 is a schematic diagram of the structure of the second embodiment of the present disclosure.

As shown in FIG. 2, in the second embodiment of the present disclosure, the first power source is an electric motor 70, and the rotor shaft of the electric motor 70 and the first input shaft 21 are integrated.

Other contents of the second embodiment of the present disclosure are the same as those of the first embodiment, and will not be described repeatedly here.

Third Embodiment

In the third embodiment of the present disclosure, as shown in FIG. 1, a torsional shock absorber 73 is provided between the engine 71 and the ISG electric motor 72. The torsional shock absorber 73 has damping effect and reduces torsional stiffness at the joint of the engine and the ISG electric motor, thereby reduces natural frequency of torsional vibration and eliminates torsional vibration.

Other contents of the third embodiment of the present disclosure are the same as those of the first embodiment, and will not be described repeatedly here.

The above descriptions are merely preferable embodiments of the present disclosure, and are not used to limit the protection scope of the present disclosure. Any modifications, equivalent substitutions or improvements made within the spirit and principle of the present disclosure are all included in the protection scope of the present disclosure.

What is claimed is:

1. A vehicle driving assembly with double power sources transversely placed in a vehicle, connected to a vehicle axle half shaft, wherein
the vehicle driving assembly comprises a first power source, a second power source and an automatic transmission, the automatic transmission is provided with a first input shaft and a second input shaft, the first input shaft and the second input shaft are separate and rotate individually, the first power source is connected to the first input shaft singly, the second power source is connected to the second input shaft singly, and a differential is provided at a joint of the automatic transmission and the vehicle axle half shaft;
in the automatic transmission, a first intermediate shaft is provided parallel to the first input shaft, a second intermediate shaft is provided in the direction coaxial with the first input shaft, a third intermediate shaft is provided in the direction coaxial with the first intermediate shaft, a first clutch is provided between the first intermediate shaft and the third intermediate shaft, and a second clutch is provided between the first input shaft and the second intermediate shaft;
the first input shaft is provided with a first gear, the first intermediate shaft is provided with a second gear, and the first gear and the second gear are engaged to transmit power;
the second intermediate shaft is provided with a third gear, the third intermediate shaft is provided with a fourth gear, and the third gear and the fourth gear are engaged to transmit power;
the third intermediate shaft is further provided with a fifth gear at a position between the first clutch and the fourth gear, the differential is provided with a sixth gear, and the fifth gear and the sixth gear are engaged to transmit power; and
the second input shaft is provided with a seventh gear, and the seventh gear and the third gear are engaged to transmit power;
wherein when the first clutch is in engagement, the first power source transmits power to the vehicle axle half shaft via successively the first input shaft, the first gear, the second gear, the first intermediate shaft, the third intermediate shaft, the fifth gear, the sixth gear and the differential;
wherein when the second clutch is in engagement, the first power source transmits power to the vehicle axle half shaft via successively the first input shaft, the second intermediate shaft, the third gear, the fourth gear, the third intermediate shaft, the fifth gear, the sixth gear and the differential.

2. The vehicle driving assembly according to claim 1, wherein the second power source is an electric motor, and the second power source transmits power to the vehicle axle half shaft via successively the second input shaft, the seventh gear, the third gear, the fourth gear, the third intermediate shaft, the fifth gear, the sixth gear and the differential.

3. The vehicle driving assembly according to claim 2, wherein the engaged transmission ratio of the seventh gear, the third gear and the fourth gear is i4, the engaged transmission ratio of the fifth gear to the sixth gear is i3, and when both the first clutch and the second clutch are released, the engaged transmission ratio in the automatic transmission is i4×i3.

4. The vehicle driving assembly according to claim 1, wherein the engaged transmission ratio of the first gear to the second gear is i1, the engaged transmission ratio of the fifth gear to the sixth gear is i3, and when the first clutch is in engagement, the engaged transmission ratio in the automatic transmission is i1×i3.

5. The vehicle driving assembly according to claim 1, wherein the engaged transmission ratio of the third gear to the fourth gear is i2, the engaged transmission ratio of the fifth gear to the sixth gear is i3, and when the second clutch is in engagement, the engaged transmission ratio in the automatic transmission is i2×i3.

6. The vehicle driving assembly according to claim 1, wherein the first power source is an electric motor or the combination of an engine and an integrated starter generator electric motor.

7. The vehicle driving assembly according to claim 1, wherein the first power source is the combination of an engine and an integrated starter generator electric motor, and a torsional shock absorber is provided between the engine and the integrated starter generator electric motor.

8. The vehicle driving assembly according to claim 1, wherein the vehicle axle half shaft is a front axle half shaft or a rear axle half shaft, and the first clutch and the second clutch are face tooth clutches.

* * * * *